(12) United States Patent
Qian et al.

(10) Patent No.: US 10,741,175 B2
(45) Date of Patent: Aug. 11, 2020

(54) SYSTEMS AND METHODS FOR NATURAL LANGUAGE UNDERSTANDING USING SENSOR INPUT

(71) Applicant: Lenovo (Singapore) Pte. Ltd., New Tech Park (SG)

(72) Inventors: Ming Qian, Cary, NC (US); Song Wang, Cary, NC (US); John Weldon Nicholson, Cary, NC (US); Jatinder Kumar, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 412 days.

(21) Appl. No.: 15/365,243

(22) Filed: Nov. 30, 2016

(65) Prior Publication Data

US 2018/0151176 A1 May 31, 2018

(51) Int. Cl.
| | |
|---|---|
| *G10L 15/22* | (2006.01) |
| *G06F 3/01* | (2006.01) |
| *G06F 3/03* | (2006.01) |
| *G06K 9/00* | (2006.01) |
| *G01S 19/14* | (2010.01) |

(52) U.S. Cl.
CPC ............. *G10L 15/22* (2013.01); *G06F 3/017* (2013.01); *G06F 3/0304* (2013.01); *G06K 9/00302* (2013.01); *G06K 9/00335* (2013.01); *G01S 19/14* (2013.01); *G10L 2015/227* (2013.01); *G10L 2015/228* (2013.01)

(58) Field of Classification Search
CPC ..................................................... G10L 15/22
USPC ......................................................... 704/257
See application file for complete search history.

(56) References Cited

U.S. PATENT DOCUMENTS

| | | | |
|---|---|---|---|
| 6,477,239 B1* | 11/2002 | Ohki ................... | G09B 21/009 348/14.01 |
| 2002/0111794 A1* | 8/2002 | Yamamoto ............. | G10L 13/08 704/200 |
| 2002/0118103 A1* | 8/2002 | Tabe ....................... | B60Q 1/22 340/436 |
| 2002/0181773 A1* | 12/2002 | Higaki ............... | G06K 9/00335 382/190 |
| 2003/0117485 A1* | 6/2003 | Mochizuki ............. | G06T 13/40 348/14.01 |
| 2006/0247927 A1* | 11/2006 | Robbins .................. | H03G 3/32 704/225 |
| 2009/0150160 A1* | 6/2009 | Mozer ..................... | G06F 3/011 704/275 |
| 2013/0085758 A1* | 4/2013 | Csoma .................. | G16H 50/20 704/260 |

(Continued)

*Primary Examiner* — Huyen X Vo
*Assistant Examiner* — Timothy Nguyen
(74) *Attorney, Agent, or Firm* — John L. Rogitz; John M. Rogitz

(57) ABSTRACT

In one aspect, a device includes a processor, a microphone accessible to the processor, at least a first sensor that is accessible to the processor, and storage accessible to the processor. The storage bears instructions executable by the processor to receive first input from the microphone that is generated based on audible input from a user. The instructions are also executable by the processor to receive second input from the first sensor, perform natural language understanding based on the first input, augment the natural language understanding based on the second input, and provide an output based on the augmentation.

20 Claims, 5 Drawing Sheets

(56) References Cited

U.S. PATENT DOCUMENTS

2016/0104486 A1* 4/2016 Penilla .................... H04L 67/12
                                                        704/232
2018/0063325 A1* 3/2018 Wilcox ................ G09B 21/001

* cited by examiner

SYSTEMS AND METHODS FOR NATURAL LANGUAGE UNDERSTANDING USING SENSOR INPUT

BACKGROUND

As recognized herein, current audible input-enabled devices can incorrectly interpret a person's voice input of a command to execute a function such as an Internet search. While such devices can employ various tactics to interpret the voice input, they merely do so based on the audible input itself. There are currently no adequate solutions to the foregoing computer-related problem.

SUMMARY

Accordingly, in one aspect a device includes a processor, a microphone accessible to the processor, at least a first sensor that is accessible to the processor, and storage accessible to the processor. The storage bears instructions executable by the processor to receive first input from the microphone, with the first input being generated based on audible input from a user. The instructions are also executable by the processor to receive second input from the first sensor, perform natural language understanding based on the first input, augment the natural language understanding based on the second input, and provide an output based on the augmentation.

In another aspect, a method includes receiving, at a device, natural language input from a user and performing natural language understanding based on the natural language input to generate a natural language output. The method also includes receiving input from a sensor, and altering the natural language output based on the input from the sensor. Additionally, the method includes performing at least one action at the device based on the altered natural language output.

In still another aspect, a computer readable storage medium that is not a transitory signal includes instructions executable by a processor to receive first input from a microphone accessible to the processor, with the first input being generated based on audible input from a user. The instructions are also executable by the processor to receive second input from a camera, perform natural language understanding based on the first input, augment the natural language understanding based on the second input from the camera to generate a natural language output, and execute at least one task based on the natural language output.

The details of present principles, both as to their structure and operation, can best be understood in reference to the accompanying drawings, in which like reference numerals refer to like parts, and in which:

DETAILED DESCRIPTION

Figure 1:
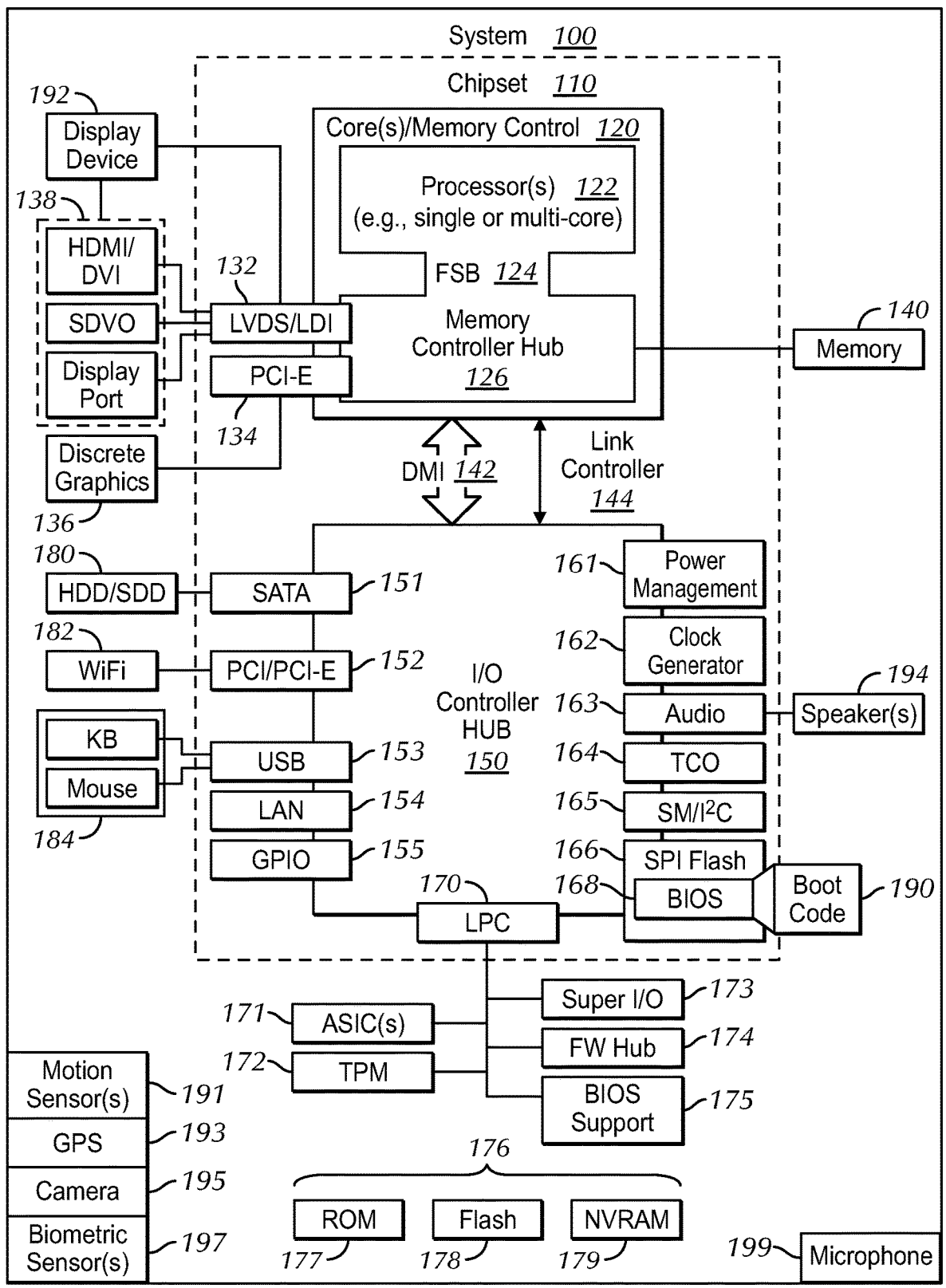
FIG. 1 is a block diagram of an example system in accordance with present principles.

Described herein are systems and methods for natural language processing and understanding. In addition to human speech, humans sometimes supplement their voice expressions with related non-voice modalities such as gestures, posture, facial expressions, etc. that give context for the speech's content. A device as disclosed herein, by using sensor data to feed related information to a language model executing at the device, may identify better context for the user's speech and hence more precise language understanding of the intention of the user.

Thus, a device in accordance with present principles need not, when a user's intent cannot be identified to a threshold confidence level based on the speech alone, present an output such as "I do not understand" that can be frustrating to the user. Instead, the device may avoid this computer-related problem by seeking out additional information using sensors on the device and resolving the ambiguity in the user's intent using the sensor information, thereby enhancing the user's experience with the device by understanding the speech and triggering better responses and/or applications by the device.

Accordingly, the description below provides for use of data such as location and time, and data analysis such as image processing, gesture recognition, and facial expression recognition to resolve any ambiguities or low confidence levels in a user's speech and to enhance things such as word/sentence disambiguation, dialog management, etc.

Additionally, multiple modalities may be jointly used for such purposes. For example, for an Internet of Things (IoT) environment at the user's personal residence, multiple IoT devices can be communicated with and their sensing readings may be used to provide better context classification for the user's speech.

What's more, such ambiguity resolution in natural language understanding by the device may be performed reactively when the speech processing results themselves point to a need for such disambiguation, dialog management and so on. Additionally or alternatively, the device may be fed such data proactively, constantly, and/or at predetermined intervals for proactive, on-the-spot disambiguation. Factors such as location, time, activity, eye fixation, applications operating in the device's foreground, etc. may all be used for disambiguation by fusing them with the user's speech itself.

Different approaches to the foregoing may be used. As one approach, sensed information may be converted to related text. For example, the speech "Let's do some cardio" may be supplemented to be "Let's do some cardio (at the gym)" based on GPS coordinates indicating that the device is at a gymnasium. "Do you like this?" may be supplemented to be "Do you like this (tea pot)?" based on image processing and object recognition of the user as holding a tea pot while speaking, with another user being identified as non-audibly responding to that question by shaking their head in the negative as also identified using image processing and gesture or facial recognition. As another example, a device's response to a question posed to it by a user that "I see three flies in the room, don't you?" may be provided that "There is only one fly" based on video processing and object recognition using video from a camera mounted in the room.

As another approach, a device undertaking present principles may use open/close tags to mark the "sensed" results/factors used to help with disambiguation. Then the voice assistant software/natural language software executing at the device can take into account the results/factors. An example natural language output under this approach may be "Do you like this <contextual type=visual object classification="tea pot">tea pot</contextual>?" The device may then generate a natural language output of the response of another person answering in the negative as follows: <contextual type=visual gesture detection="shake head">no</contextual>.

With respect to any computer systems discussed herein, a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple, Google, or Microsoft. A Unix or similar such as Linux operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware, or combinations thereof and include any type of programmed step undertaken by components of the system; hence, illustrative components, blocks, modules, circuits, and steps are sometimes set forth in terms of their functionality.

A processor may be any conventional general purpose single- or multi-chip processor that can execute logic by means of various lines such as address lines, data lines, and control lines and registers and shift registers. Moreover, any logical blocks, modules, and circuits described herein can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/or made available in a shareable library.

Logic when implemented in software, can be written in an appropriate language such as but not limited to C # or C++, and can be stored on or transmitted through a computer-readable storage medium (e.g., that is not a transitory signal) such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown that is understood to have a housing for the components described below. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be, e.g., a game console such as XBOX®, and/or the system 100 may include a wireless telephone, notebook computer, and/or other portable computerized device.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the conventional "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (×16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof, but in any case the drives 180 are understood to be, e.g., tangible computer readable storage mediums that are not transitory signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

Additionally, the system 100 may include an audio receiver/microphone 199 that provides input from the microphone 199 to the processor 122 based on audio that is detected, such as via a user providing audible input to the microphone. The system 100 may also include one or more sensors, such as a motion sensor 191 that may be one or both of a gyroscope that senses and/or measures the orientation of the system 100 and provides input related thereto to the processor 122 and an accelerometer that senses acceleration and/or movement of the system 100 and provides input related thereto to the processor 122. A GPS transceiver 193 is another example of a sensor in accordance with present principles that may be included on the system 100, with the GPS transceiver 193 being configured to receive geographic position information from at least one satellite and provide the information to the processor 122. However, it is to be understood that another suitable position receiver other than a GPS receiver may be used in accordance with present principles to determine the location of the system 100.

As another example of a sensor in accordance with present principles, the system 100 may include a camera 195 that gathers one or more images and provides input related thereto to the processor 122. The camera may be a thermal imaging camera, a digital camera such as a webcam, a three-dimensional (3D) camera, and/or a camera otherwise integrated into the system 100 and controllable by the processor 122 to gather pictures/images and/or video.

Still further, one or more biometric sensors 197 may also be included on the system 100 to provide input to the processor 122 for use in accordance with present principles. Examples of biometric sensors that may be used include heart rate sensors, blood pressure sensors, sleep sensors, fingerprint sensors, retina sensors, perspiration sensors, body temperature sensors, etc.

It is to be understood that an example client device or other machine/computer may include fewer or more features than shown on the system 100 of FIG. 1. In any case, it is to be understood at least based on the foregoing that the system 100 is configured to undertake present principles.

Figure 2:
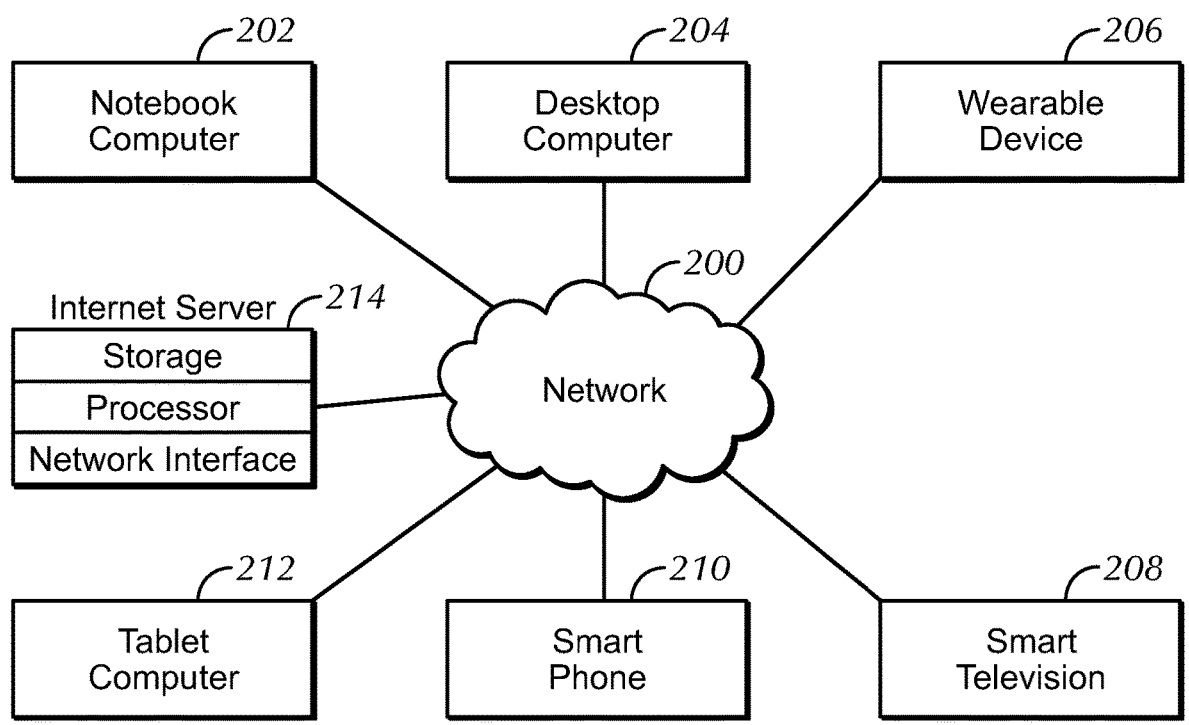
FIG. 2 is a block diagram of an example network of devices in accordance with present principles.

Turning now to FIG. 2, example devices are shown communicating over a network 200 such as the Internet in accordance with present principles. It is to be understood that each of the devices described in reference to FIG. 2 may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, and a server 214 such as an Internet server that may provide cloud storage accessible to the devices 202-212. It is to be understood that the devices 202-214 are configured to communicate with each other over the network 200 to undertake present principles.

Figure 3:
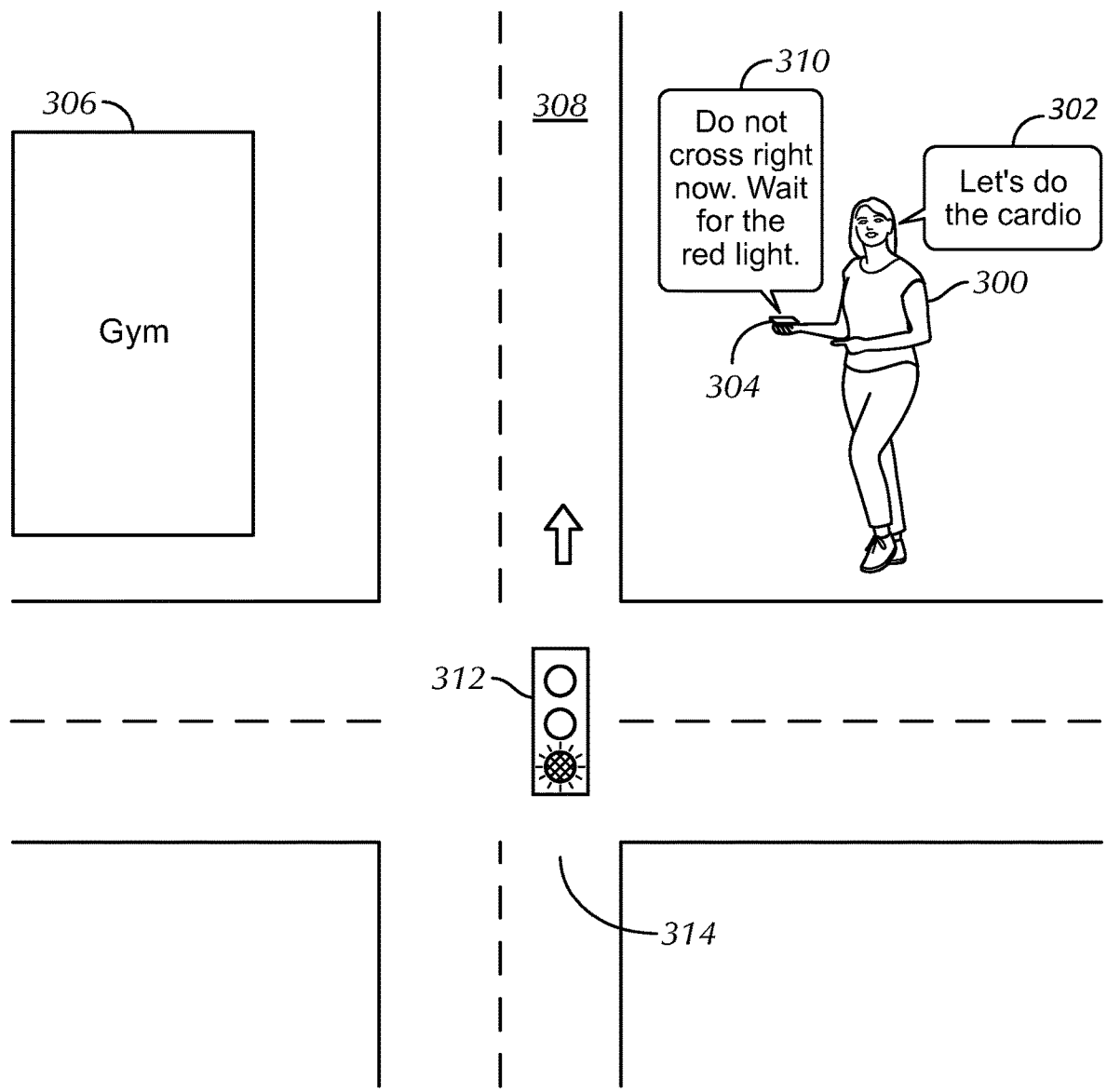
FIG. 3 is an illustration of an example in accordance with present principles.

Referring to FIG. 3, it shows an example illustration in accordance with present principles. A user 300 is providing natural language input 302 to the user's smart phone 304, with the natural language input 302 indicating "Let's do the cardio". Note that the user 300, while providing the natural language input 302, is pointing toward a gym 306 across the street 308 from the user 300.

Thus, assume that while using natural language understanding, the device 304 identifies a potential ambiguity in the user's input 302, with the ambiguity being whether the user's mention of "cardio" pertains to doing cardiovascular physical exercise or whether it pertains to having a cardiovascular exam performed by a physician. Based on this, the device 304 may use input from a camera on the device 304 to identify the user 300 as gesturing toward the gym 306 by pointing with a finger at it. The device 304 may also use input from its GPS transceiver and a history of past user action to determine that the user is within a first threshold distance to the gym 306, that the user 300 has visited the gym 306 a threshold number of times in the past, and/or that the user 300 is at least a second threshold distance away from the location of the nearest cardiovascular physician or location of a physician that the user 300 has visited in the past. Based on determining one or more of these factors, the device 304 may determine with increased confidence that the natural language input 302 pertains to doing cardiovascular exercise at the gym 306 rather than visiting a cardiovascular physician. The device 304 may also determine that, to get to the gym 306 to do cardiovascular exercise, the user 300 will most likely cross the street 308.

Accordingly, the device 304 may provide an audible natural language output 310 stating: "Do not cross right now" in response to the device 304 determining that the user 300 will have to cross the street 308 to reach the gym 306 to do cardiovascular exercise. The device 304 may determine this output 310 by wirelessly communicating with a traffic light 312 to determine that through-traffic from the intersection 314 in the direction of the user 300 has a green light and thus vehicles might be traveling through the intersection 314 in the user's direction, posing a hazardous condition to the user 300 should the user 300 try to cross the street 308 to reach the gym 306 at that moment.

In addition to warning the user 300 not to cross the street 308 at that moment, the device 304 may include other instructions for the user to take action as part of the natural language output 310, such as an instruction to "Wait for the red light" in the direction of the through-traffic when it might be safer for the user 300 to cross the street 308. Such an instruction may be identified based on wireless communication with the traffic light 312. It may also be identified based on input from the camera on the device 304 to determine that there are no vehicles currently in the area and traveling toward the user 300, and/or based on input from a microphone on the device 304 to analyze Doppler effects to determine whether any vehicles are approaching the user 300 based on the sound the vehicles generate. Wireless communication between the device 304 and computers on the vehicles themselves may also be used to determine whether the vehicles are approaching and what their locations might be relative to the device 304.

Figure 4:
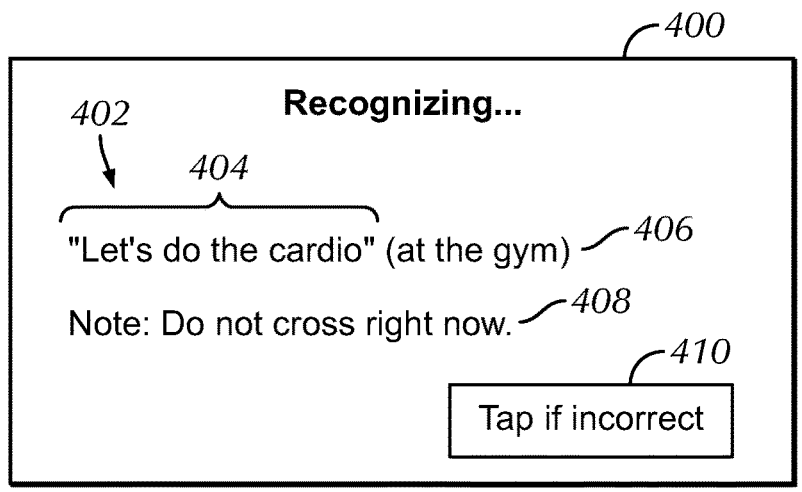
FIGS. 4 and 6 are example user interfaces (UIs) in accordance with present principles.

Continuing the example from above but referring now to FIG. 4, it shows an example natural language understanding user interface (UI) 400 that may be presented on a display of the device 304. The UI 400 may include an indication 402 that natural language understanding is being or has been performed. The UI 400 may also include recognition output 402 of the natural language understanding in natural language format (as opposed to another format such as extensible markup language (XML) format). The recognition output 402 may include a first section 404 in quotations, which visually indicates a set of words spoken by the user 300 as recognized by the device 304. The recognition output 402 may also include a second section 406 in parenthesis, which visually indicates additional words added to the recognition output 402 based on input from one or more sensors on the device 304 as disclosed herein.

Still describing FIG. 4, note that the natural language output 310 is also presented in visual form 408 on the UI 400. Further, though not shown in FIG. 4 for simplicity, in some embodiments the sensors, types of sensors, or other factors (e.g., time of day) that were used to resolve an ambiguity in the device's natural language understanding may be indicated in text on the UI 400 so that a user may see that there was an ambiguity and/or what was used by the device to resolve the ambiguity and provide the natural language output 408.

Additionally, a selector 410 may be presented on the UI 400 that is selectable to provide input to the device 304 confirming that it correctly determined the recognition output 402 based on the user's spoken natural language and the input from the one or more sensors on the device 304.

Though not shown for simplicity, another selector may also be presented on the UI 400 that is selectable to provide input to the device 304 that the device 304 incorrectly determined the recognition output 402. In some embodiments, responsive to selection of such a selector, the device may actuate more sensors and/or identify more factors from sources other than the user's voice input to further attempt to resolve the ambiguity in accordance with present principles.

Figure 5:
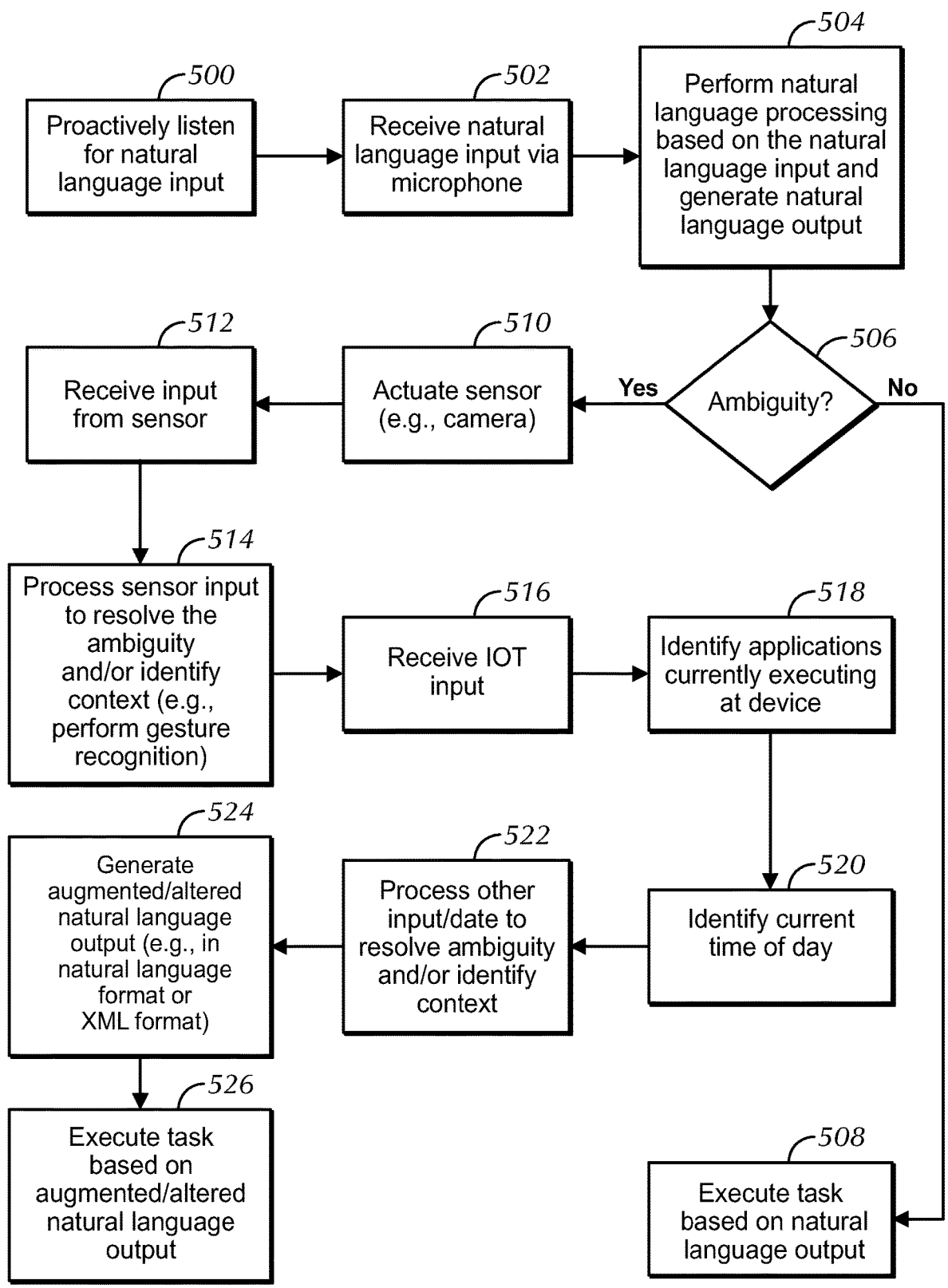
FIG. 5 is a flow chart of an example algorithm in accordance with present principles.

Turning to FIG. 5, it shows example logic that may be executed by a device such as the system 100 and/or device 304 in accordance with present principles. Beginning at block 500, the logic may proactively listen for natural language input. For instance, at block 500 the logic may keep a microphone powered on to sense audio spoken by a user and to process the audio to determine if the device has any output to provide in response. Proactively listening may be contrasted with listening in response to input to listen, such as input of a "wake up" word from a user after which the device may listen for ensuing voice input on which to execute a command.

From block 500 the logic may continue to block 502. At block 502 the logic may, based on proactive listening or after being prompted to listen, receive the user's speech as natural language input via the microphone on the device. The logic may then move to block 504 where the logic may perform natural language processing based on the received input using voice and word recognition, and as part of the natural language processing at block 504 the logic may specifically perform natural language understanding to, for example, identify context and derive additional meaning for the user's speech beyond the words of the speech itself. Based on the natural language processing, the logic may generate an output at block 504. The output may be generated in natural language format, such as that shown in reference to the first section 404 of FIG. 4.

From block 504 the logic may proceed to decision diamond 506. At diamond 506 the logic may determine whether an ambiguity has been recognized from the received input that cannot be resolved by the device, for instance, with certainty above a threshold tolerance. An example of such an ambiguity may be appreciated from the example described above in reference to FIGS. 3 and 4, where the device reached an ambiguity as to whether "Let's do the cardio" pertained to doing cardiovascular physical exercise or having a cardiovascular exam performed by a physician. If a negative determination is made at diamond 506, the logic may proceed to block 508 where the logic may execute a task or perform a function based on the natural language output generated at block 504.

However, if an affirmative determination is made at diamond 506 that an ambiguity exists, the logic may instead proceed from diamond 506 to block 510. Responsive to the affirmative determination, at block 510 the logic may actuate one or more sensors on the device, such as a camera, motion sensor, GPS transceiver, or biometric sensor. The logic may then move to block 512 where the logic may receive input from the actuated sensor(s). The logic may next proceed to block 514 where the logic may process the sensor input to resolve the ambiguity and/or identify context for the user's natural language input.

Thus, again using the example above from the description of FIGS. 3 and 4, at block 512 the logic may receive input from a camera on the device and then at block 514 the device may perform object and gesture recognition to identify the user from the camera input and that the user is pointing toward the known location of a gymnasium rather than a physician's office.

From block 514 the logic may proceed to block 516. At block 516 the logic may receive input from one or more Internet of Things (IoT) sensors or other IoT devices, which may also be used to resolve the ambiguity and/or identify context for the user's natural language input. For example, based on a determination that the user is about to go to the gym (again using the example above) or on its own initiative responsive to determining that the user is moving away from his or her personal residence, the device may receive IoT input at block 516, determine that the user's Internet-enabled stove has been left on at block 522, and provide an audible natural language output at the device at block 526 that "You left the stove on when you left home. Did you mean to leave it on? If not, should I turn it off?" In such an example, the user may audibly respond in the affirmative that the device should turn the stove off, and responsive to receiving the audible response the device may transmit a command to the stove to turn off.

Before further describing blocks 522 and 526, note that in some embodiments the logic of FIG. 5 may proceed from block 516 to block 518. At block 518 the logic may identify one or more applications that are currently executing at the device, which may further assist the device in resolving the ambiguity and/or identifying context for the user's natural language input. For instance, if an exercise application has been initiated or launched at the device that provides instructions on physical exercises for the user to do, the logic may identify as much at block 518 and then at block 522 use that identification to resolve the ambiguity in the user's statement "Let's do the cardio" by determining that it pertains to physical exercise since the device is currently executing the exercise application. That, in turn, may be used at block 524 to generate the augmented natural language output of "Let's do the cardio (at the gym)".

Still describing FIG. 5, from block 518 the logic may move to block 520 where it may identify a current time of day (e.g., in the time zone in which the device is currently located). The current time of day may be determined, for instance, by accessing a clock application executing at the device to determine the current time of day as indicated by the clock application. The logic may then move to block 522 where the current time of day may be used to resolve the ambiguity and/or identify context for the user's natural language input. For instance, using the "Let's do the cardio" example again and based on the current time of day being 2:00 a.m., the device may determine that since normal physician office hours are 8:00 a.m. to 5:00 p.m. and since the current time of day is outside of those hours, the user's natural language input of "Let's do the cardio" is referring to doing physical exercise at a gymnasium that is open twenty four hours rather than having a cardiovascular exam performed by a physician.

Describing block 522 in more detail, the processing at this step may be performed by accessing one or more relational databases and using the sensor input, IoT input, identifications of applications currently executing, and/or current time of day to identify key words or other information from the database that are correlated to those things (or particular aspects or data ranges thereof). Then at block 524 the logic may generate an augmented and/or altered natural language output based on the results from block 522, such as based on any key words that are identified. Thus, again using the "cardio" example, the user's natural language input of "Let's do the cardio" may be augmented to be "Let's do the cardio (at the gym)", with the portion in parenthesis being added by the device at block 524 based on a correlation of current GPS coordinates of the user's device with a location of a gym.

Furthermore, note that while such natural language output may be generated in natural language format as in the example above, it may also be generated in another format such as hypertext markup language (HTML) format or extensible markup language (XML) format. HTML and XML formats may be used so that the device may perform further computer processing on the output to execute a corresponding task, though in some embodiments natural language format may also be used for such purposes.

In any case, the logic of FIG. 5 may conclude at block 526 where the logic may execute one or more corresponding tasks based on the augmented and/or altered natural language output generated at block 524, such as determining whether it is currently safe for the user to cross the street 308 to go to the gym 306 and providing an audible output regarding whether it is currently safe.

Figure 6:
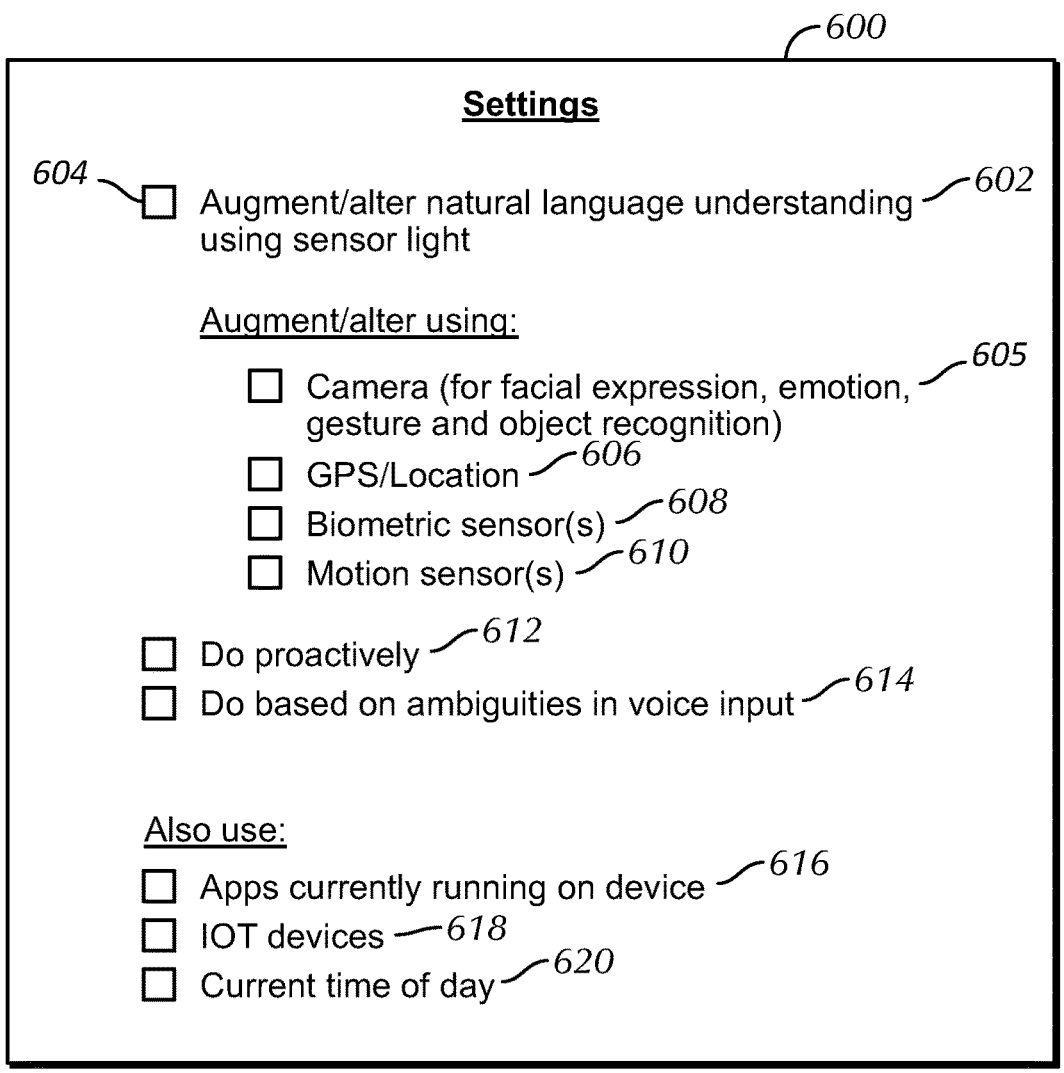

Continuing the detailed description in reference to FIG. 6, it shows an example user interface (UI) 600 that may be presented on a display of a device undertaking present principles for configuring natural language understanding settings. The UI 600 may include a first option 602 that is selectable using check box 604 to enable the device to augment and/or its alter natural language understanding in accordance with present principles, such as using sensor input, current time of day, etc.

The UI 600 may also include respective options 605, 606, 608, and 610 to enable augmentation and/or alteration of natural language understanding specifically using camera input, GPS transceiver input, biometric sensor input, and motion sensor input. Each option 605-610 may be selected by directing input (e.g., touch input) to the respective check box shown adjacent to each option to check the check box, and more than one of the options may be selected and hence enabled at the same time.

The UI 600 also shows options 612 and 614 that are respectively selectable to enable proactive performance of natural language augmentation and/or alteration as voice input is received (option 612), and/or to enable performance of natural language augmentation and/or alteration based on first identifying one or more ambiguities in the voice input (option 614). Note that the options 612 and 614 are not mutually exclusive and so both options may be selected and hence enabled at the same time using the check boxes adjacent to each one.

Still referring to FIG. 6, the UI 600 may further include an option 616 that is selectable to enable identification of applications that are currently executing at the device to augment and/or alter natural language output, an option 618 that is selectable to enable use of input from IoT devices to augment and/or alter natural language output, and an option 620 that is selectable to enable use of time of day to augment and/or alter natural language output. Each option 616-620 may be selected by directing input to the respective check box shown adjacent to each one, and more than one of the options may be selected and hence enabled at the same time.

Next, more examples illustrating present principles will be described. Providing a first example, suppose a first user asks a second user "Do you like it?" while proactive natural language understanding is enabled. The device may then receive input from a camera imaging the second user's face and perform facial expression recognition or posture recognition using the input to identify that the second user either favors or dislikes whatever "it" is that the first user is referencing. In addition to or in lieu of that, the device may use the input from the camera to perform gesture recognition to identify the second user as gesturing an affirmative head nod to the question (an up and down nod) or a negative head shake to the question (a side to side shake) to identify that the second user either favors or dislikes, respectively, whatever "it" is that the first user is referencing. The device may even use input from its camera or another camera with which it is communicating to identify whatever the "it" is that is being pointed at by the first user (using object and gesture recognition).

As another example, suppose a user asks "What is it?" as identified by a device using natural language processing. The device may receive input from a camera to identify the direction of the user's gaze using eye tracking and an object to which the user is pointing using gesture and object recognition, and hence identify what "it" is to which the pronoun "it" refers.

Providing yet another example, suppose there is a pause in audible input being provided by a user to a device. The device may determine whether the pause is in fact a temporary pause in the audible input or whether the user has completed providing the audible input to the device. The device may do so by receiving input from a camera and then identifying, using gesture recognition, whether the user is holding up his or her hand in a "stop" manner that the device may then correlate (e.g., using a relational database) to indicating a temporary pause or "wait a moment" command.

As another example, suppose a user announces "I will cross the street now" while at an intersection, which may be recognized by the user's device while the device is proactively listening for natural language input. Then, using input from a camera on the device and image processing (e.g., object recognition), the device may identify the street and/or intersection being referenced. Additionally or alternatively, the device may identify the street and/or intersection nearest to the user, and hence the street the user is most likely referring to, using input from a GPS transceiver on the device to identify the device's current location and the nearest street/intersection to the device's location. In either case, the device may then use input from a compass on the device to determine a direction the user is facing while holding the device, and may also use input from a camera imaging a traffic light at the intersection, to determine that the traffic light is red and a "do not walk" sign is currently in use for foot traffic crossing the street in the direction the user is facing. Note that in addition to or in lieu of camera input for identifying the red light, the device may also communicate wirelessly with the traffic light. Regardless, responsive to determining that the traffic light is red and a "do not walk" sign is being used for foot traffic in the direction the user is facing, the device may output a warning message for the user to not cross the street at that moment but to wait until a "walk" signal is used for foot traffic in the direction the user is facing.

As still another example, suppose a user provides natural language input to a device asking "I see three flies in the room, don't you?" In response to recognizing the question, the device may actuate a camera in communication with it (e.g., on the device itself or within the room the user is currently in) to receive images from the camera and identify how many flies are in the room using object recognition. The device may then provide a natural language output concurring that there are three flies in the room or indicating how many flies the device has counted as being in the room if different than three.

Next, suppose a user provides natural language input to a device asking "What is the impact on my health if I eat these foods?" The device may actuate a camera in communication with it to receive images from the camera, identify the food being referenced by the user such as food being looked at by the user or food that is most-near the user, and then perform the task of searching over the Internet for health information related to the identified food and providing an audible output pertaining to the food in response.

Now suppose a user indicates "My blood pressure was 53/30 something . . . I was just shaking and . . . I guess I was going into shock." The user's device may identify the foregoing using proactive listening. Then, based on the words spoken by the user and/or by executing emotion recognition using images from a camera of the user's face, the device may identify that the user is experiencing the emotion of fear. In response to that, the device may execute one or more tasks such as accessing stored biometric data for the user (as previously received from a biometric sensor) to determine whether the user is getting an adequate amount of sleep, an adequate amount of exercise, an adequate amount of emotional support, etc. since not receiving an adequate amount of one of those things can contribute to the user's fearful emotions or stressed demeanor. If the device determines that the user is not getting enough of one or more of those things, the device may provide an audible natural language output at the device in response, such as an output (in the case of inadequate sleep) that "You have not been sleeping the recommended amount. Try getting more sleep tonight and you might feel better."

As a different example using the "Let's do the cardio" natural language input from above, suppose the device again identifies the ambiguity regarding whether the user's mention of "cardio" pertains to doing cardiovascular physical exercise or whether it pertains to having a cardiovascular exam performed by a physician. The device may receive input from a motion sensor (such as an accelerometer) on the device that indicates motion above at least a threshold amount, and/or may receive input from a biometric sensor that indicates a heart rate above at least a threshold amount. Based on the motion and/or heart rates being above the respective threshold amounts, the device may resolve the ambiguity in the natural language input as being related to active, physical exercise, whereas if the motion and/or heart rates were below the respective threshold amounts the device may resolve the ambiguity as being related to a cardiovascular examination instead.

Thus, going further into this example to provide further explanation, the user's device can employ an entity-intent approach to "force" a structure on the natural language of the user so that, for each intent, there might be a special set of entities associated with it. For example, the intent "cardio <exercise>" may be associated with the entity "gym" and "high activity level", while the intent "cardio <exam>" may be associated with the entities "hospital" and "low activity level". More generally, entities may be related to, for example, place, time, activity, biometric, etc., and the entities may be used for both natural language understanding, as well as for training of sensing so that the device may later have a higher confidence of something based on sensor input owing to use of the natural language understanding to interpret the sensor input.

Before concluding, it is to be understood that although a software application for undertaking present principles may be vended with a device such as the system 100, present principles apply in instances where such an application is downloaded from a server to a device over a network such as the Internet. Furthermore, present principles apply in instances where such an application is included on a computer readable storage medium that is being vended and/or provided, where the computer readable storage medium is not a transitory signal and/or a signal per se.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged or excluded from other embodiments.

What is claimed is:

1. A device, comprising:
    at least one processor;
    a microphone accessible to the at least one processor;
    at least a first sensor other than the microphone and that is accessible to the at least one processor; and
    storage accessible to the at least one processor and bearing instructions executable by the at least one processor to:
    receive first input from the microphone, the first input generated based on audible input from a user;
    receive second input from the first sensor;
    perform natural language understanding based on the first input;
    augment the natural language understanding based on the second input;
    provide an output based on the augmentation; and
    present a user interface (UI) on an electronic display accessible to the at least one processor, wherein the UI comprises an option that is selectable to enable the device to perform respective augmentations to respective natural language understandings as respective natural language inputs are received, and wherein the UI comprises an option that is selectable to enable the device to perform respective augmentations to respective natural language understandings based on respective ambiguities in respective natural language understandings.

2. The device of claim 1, wherein the first sensor is a camera, and wherein the instructions are executable by the at least one processor to:
    perform gesture recognition based on input from the camera; and
    augment the natural language understanding based on the gesture recognition.

3. The device of claim 1, wherein the first sensor is a camera, and wherein the instructions are executable by the at least one processor to:
    perform object recognition based on input from the camera; and
    augment the natural language understanding based on the object recognition.

4. The device of claim 1, wherein the first sensor is a camera, and wherein the instructions are executable by the at least one processor to:
    perform facial expression recognition based on input from the camera; and
    augment the natural language understanding based on the facial expression recognition.

5. The device of claim 1, wherein the first sensor is a global positioning system (GPS) transceiver, and wherein the instructions are executable by the at least one processor to:
    identify a current location of the device based on input from the GPS transceiver; and
    augment the natural language understanding based on the current location.

6. The device of claim 1, wherein the first sensor is an accelerometer, and wherein the instructions are executable by the at least one processor to:
    identify movement based on input from the accelerometer; and
    augment the natural language understanding based on the movement.

7. The device of claim 1, wherein the output comprises one or more of: a warning for a person not to do something, and an instruction for the user to take an action that is identified based on the second input.

8. The device of claim 1, wherein the instructions are executable by the at least one processor to:
    augment the natural language understanding based on the second input and based on at least one application that is currently executing at the device.

9. The device of claim 1, comprising the electronic display.

10. The device of claim 1, wherein the options are different from each other.

11. The device of claim 1, wherein the output comprises presentation of text on the electronic display, the text corresponding to the augmented natural language understanding.

12. The device of claim 11, wherein the text comprises first text corresponding to one or more words determined from the natural language understanding itself, and wherein the text comprises second text corresponding to one or more words determined to be augmentations to the natural language understanding.

13. The device of claim 12, wherein the first text is visually distinguished from the second text as presented on the electronic display.

14. The device of claim 13, wherein the second text is presented one or more of: within parentheses to visually distinguish the second text from the first text, in quotation marks to visually distinguish the first text from the second text.

15. A method, comprising:
    receiving, at a device, natural language input from a user;
    performing natural language understanding based on the natural language input to generate a natural language output;
    receiving input from a sensor;
    altering the natural language output based on the input from the sensor;
    performing at least one action at the device based on the altered natural language output; and presenting a user interface (UI) on an electronic display, wherein the UI comprises an option that is selectable to enable the device to perform respective alterations to respective natural language outputs as respective natural language inputs are received, and wherein the UI comprises an option that is selectable to enable the device to perform respective alterations to respective natural language outputs based on respective ambiguities in respective natural language understandings.

16. The method of claim 15, wherein the UI comprises an option that is selectable to enable the device to perform respective alterations to respective natural language understandings based on current time of day.

17. The method of claim 15, wherein the UI comprises an option that is selectable to enable the device to perform respective alterations to respective natural language understandings based on camera input.

18. The method of claim 15, wherein the UI comprises an option that is selectable to enable the device to perform respective alterations to respective natural language understandings based on current location of the device.

19. The method of claim 15, wherein the UI comprises an option that is selectable a single time to enable plural respective future alterations of respective natural language understandings based on respective sensor inputs.

20. A computer readable storage medium (CRSM) that is not a transitory signal, the computer readable storage medium comprising instructions executable by at least one processor to:
receive first input from a microphone accessible to the at least one processor, the first input being generated based on audible input from a user;
receive second input from a camera;
perform natural language understanding based on the first input;
augment the natural language understanding based on the second input from the camera to generate a natural language output;
execute at least one task based on the natural language output; and
present a user interface (UI) on a display accessible to the at least one processor, wherein the UI comprises an option that is selectable to perform augmentation of natural language understanding proactively as natural language input is received, and wherein the UI comprises an option that is selectable to perform augmentation of natural language understanding based on an ambiguity in natural language understanding.

* * * * *